May 23, 1950 S. PEKAR 2,508,796
ARTICLE GRADING APPARATUS
Filed Dec. 8, 1945 2 Sheets-Sheet 1

INVENTOR
STEPHEN PEKAR
BY William A. Zalesak
ATTORNEY

May 23, 1950  S. PEKAR  2,508,796
ARTICLE GRADING APPARATUS
Filed Dec. 8, 1945  2 Sheets-Sheet 2

INVENTOR
STEPHEN PEKAR
BY William A. Zalesak
ATTORNEY

Patented May 23, 1950

2,508,796

UNITED STATES PATENT OFFICE 2,508,796

ARTICLE GRADING APPARATUS

Stephen Pekar, Linden, N. J.

Application December 8, 1945, Serial No. 633,679

7 Claims. (Cl. 209—121)

My invention relates to weight grading machines, a type of machine in which objects, for example eggs, are automatically graded in accordance with predetermined differences in their weights.

Many devices have been proposed for this purpose but the majority are subject to various disadvantages. Some are of a complicated nature involving costly manufacture, and others do not possess sufficient sensitivity to provide accurate grading. Still others result in injury to the article being handled, particularly fragile articles.

It is an object of this invention to provide a machine of simple construction having accurate sensitive and efficient means for grading articles.

A specific object of this invention is to provide in such a machine having a plurality of weighing devices, separate means associated with each weighing device, and responsive to relatively slight movement thereof under the influence of an article of specific weight to quickly and gently discharge the article after which the weighing device returns rapidly and automatically to its normal position.

Other objects are to provide an apparatus for this purpose of a large capacity of output and involving little or no cost of operation.

These and further objects will appear hereinafter.

Figure 1:
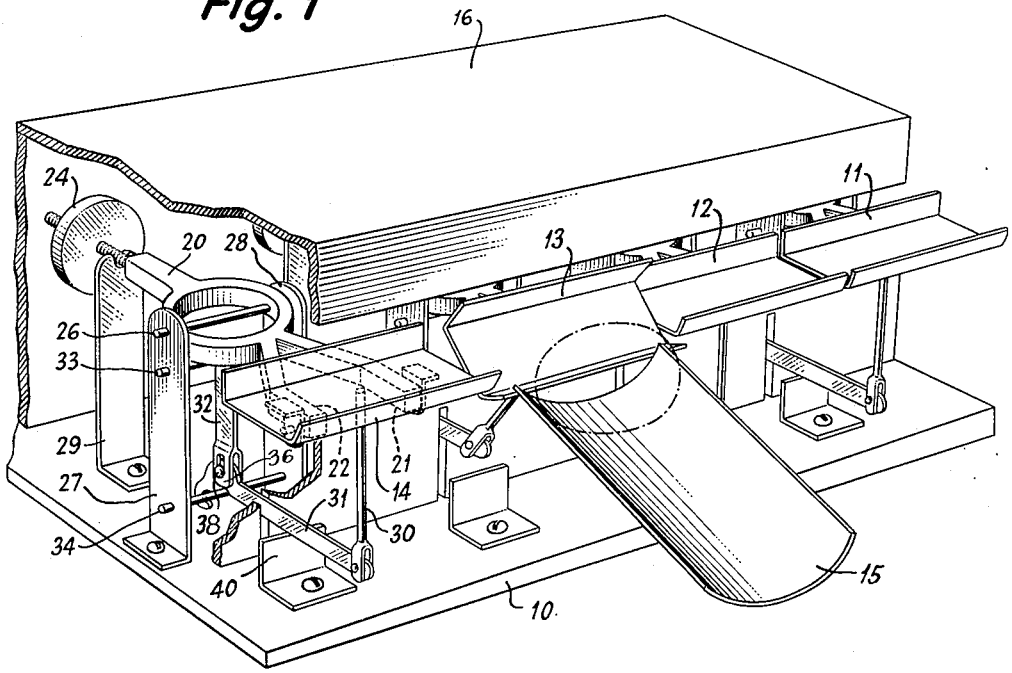
Figure 2:
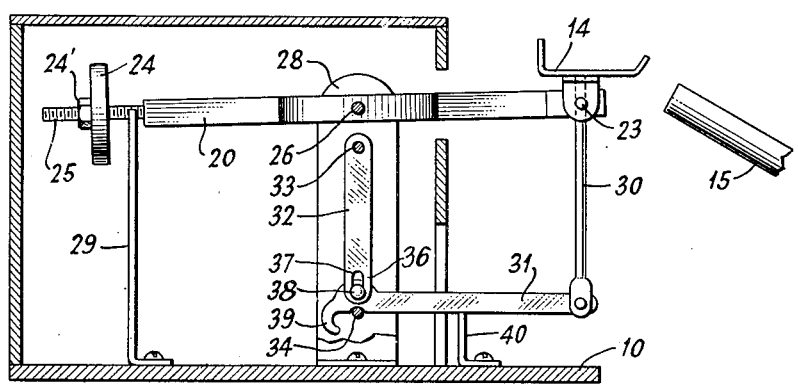
Figure 3:
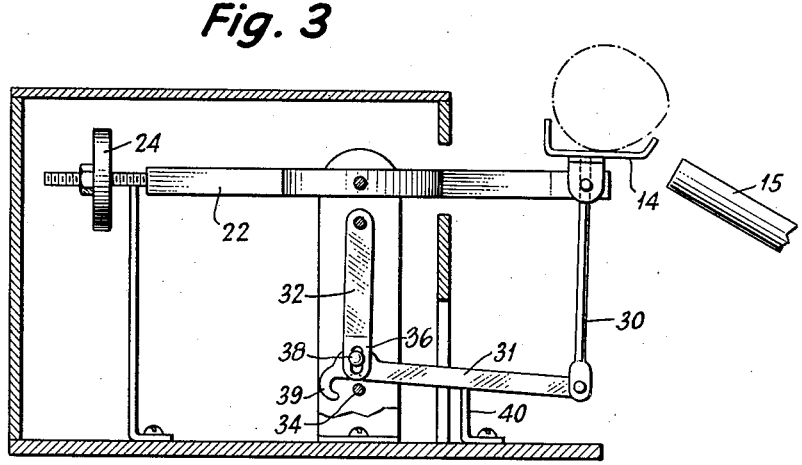
Figure 4:
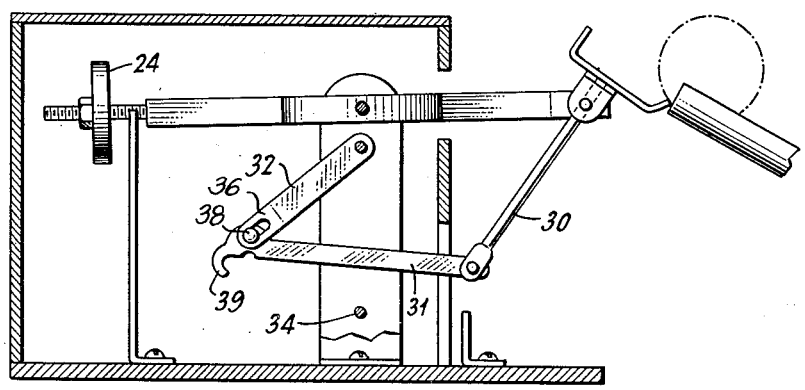

The novel features which I believe to be characteristic of my invention are set forth with particularity in the appended claims, but the invention itself will best be understood by reference to the following description taken in connection with the accompanying drawing in which Figure 1 is a perspective view with parts broken away to show details of the construction of an apparatus made according to my invention, Figures 2, 3 and 4 are transverse vertical sections showing a single unit of an apparatus made according to my invention in various stages of its operation.

Referring to Figure 1, the apparatus is mounted on a base 10 which gradually tapers from one end to the other so as to bring about an inclination of the apparatus. It is of course obvious that the base could be of one thickness and some means placed under one end to provide the inclination necessary. The apparatus includes a plurality of pivoted runways or article receiving members such as 11, 12, 13 and 14, which are balanced to be responsive to different weights of articles and along which the articles may be delivered by gravity when they are so arranged that the heavier articles will tip the runways at earlier stages of travel, the lighter articles being discharged at the left hand end, as viewed in Figure 1. The pivoted runways discharge the articles into troughs, such as 15, provided for each pivoted runway, one only of which is shown so that details of construction may not be obscured. The whole may be enclosed in a casing, such as 16, if desired.

Inasmuch as each unit is identical with the other only one such unit will be described and reference will be had to Figures 2, 3 and 4, as well as Figure 1.

As viewed in Figure 2, the trough-like runway 14 is pivoted off-center at the end of a beam member 20 which is provided with a pair of legs 21 and 22 for pivotally supporting at one end member 14. The other end of the beam is provided with threaded element 25 on which is rotatably mounted for adjustment weight 24. A locking screw 24' is also provided for locking weight 24 in position when the seals are properly adjusted. This weight may be moved closer or farther away from the pivot 26 on which the beam 20 is pivotally supported to determine the weight necessary to trip the device. The beam is pivoted by means of pin 26 supported in the brackets 27 and 28.

In accordance with my invention the trough or pivoted runway 14 is connected with a link locking mechanism comprising a rod 30 rigidly secured to the under side of the trough 14. This in turn is pivotally connected to the horizontally extending link 31 in turn pivoted to the vertically extending link 32. Link 32 is supported by and pivoted in pin 33 supported by brackets 27 and 28. The member 32 is provided at its lower end with U-shaped fork 36 into which one end of the link 31 extends and may move. This end of the link 31 is provided with a pin 38 which may slide in the slots 37 for purposes to be described. Normally the horizontally extending element 31 engages, by means of semi-circular recesses in its lower edge, stop pin or latch 34, the link resting on a bracket 40 which serves as a fulcrum in a manner to be described.

Normally the article receiving and grading device is locked in the position shown in Figure 2 and cannot be tilted until an article of predetermined weight is received.

When an article of predetermined weight is received within the proper runway, the first action is to cause a depression of the elements as shown in Figure 3. The link 31 is made to pivot about the bracket 40 as a fulcrum. This causes the left hand end of the link to be raised and released from the latch pin 34, the pin 38 carried by the link sliding up within the slots 37. It will be apparent that when the position shown in Figure 3 is reached an unbalance in the link mechanism is provided due to the off-center position of the runway and article being graded. As a result the entire mechanism tilts in the manner shown in Figure 4 to discharge the article into the trough 15. As soon as the article is discharged, the link mechanism swings back into the position shown in Figure 2. The purpose of the hook element 39 is to prevent overswinging so that the link returns to its normal position, such as indicated in Figure 2.

It will also be apparent that the mechanism will remain in this normal position until the article of predetermined weight is received. It is also apparent that the device will return quickly and automatically to grading position and that the device is rapid inasmuch as the eggs or other articles can be fed quickly at one end of the trough, gravity causing them to move quickly to the proper pivoted chute for separation and grading. It is simple, very sensitive and extremely accurate.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An apparatus for grading articles by weight including a pivoted beam, an article receiving means pivotally mounted off-center at one end of said beam, and an adjustable weight at the other end of said beam, a pivoted link mechanism secured to said pivoted article receiving means, said link mechanism including a bar normally maintained in horizontal position, one end of said bar having a recess and fixed means independent of said article receiving means and cooperating with said recess for maintaining said article receiving means in article receiving position and preventing pivotal action thereof, and means cooperating with said bar and causing rotational movement of said bar out of contact with said maintaining means when said article receiving means receives an article of predetermined weight whereby said pivoted article receiving means will be pivoted to discharge said article.

2. An apparatus for grading articles by weight including a beam pivoted intermediate its ends, an article receiving means pivotally mounted off-center at one end of said beam and a biasing means at the other end of said beam for maintaining said article receiving means in article receiving position but permitting pivotal action of said beam upon receipt of an article of predetermined weight by said weight receiving means, a link mechanism connected to said article receiving means comprising a rod rigidly secured to said article receiving means, a bar normally maintained horizontal and pivoted to the other end of said rod, and a link pivoted to the other end of said bar and to a fixed element, said bar having a recess, latching means cooperating with said bar and received within said recess for maintaining said article receiving means in article receiving position, a fixed element positioned beneath said bar and intermediate its ends for causing rotation of said bar to release said latching means from said recess upon reception of an article of predetermined weight whereby said article receiving means may be rotated to article discharging position by pivotal action, said link mechanism and said article receiving means automatically returning to article receiving position on discharge of said article.

3. An apparatus for grading articles by weight and having a plurality of like units mounted side-by-side on an inclined base, each unit including a pivoted beam, an article receiving means pivotally mounted off-center at one end of said beam, each of said article receiving means registering with the other and closely adjacent each other for receiving articles passing from one to the other, and an adjustable weight at the other end of said beam, a pivoted link mechanism secured to said pivoted article receiving means, said link mechanism including a member normally maintained in horizontal position, said member having a recess, and means cooperating with said recess for locking said article receiving means against pivotal action, and a fixed element cooperating with said member and causing rotational movement of said member out of contact with said locking means when said article receiving means receives an article of predetermined weight whereby said pivoted article receiving means will be pivoted to discharge said article.

4. An apparatus for grading articles by weight and having a plurality of like units mounted side-by-side on an inclined base, each unit including a beam pivoted intermediate its ends, an article receiving means pivotally mounted off-center at one end of said beam, all of the article receiving means registering with the others and closely adjacent each other for receiving articles passing from one of said article receiving means to the next by gravity, and an adjustable weight at the other end of said beam for permitting pivotal motion of said beam upon receipt of an article of predetermined weight by said weight receiving means, a link mechanism connected to said article receiving means comprising a rod rigidly secured to said article receiving means, a bar normally maintained horizontal and pivoted at one end to said rod, and a second link pivoted to the other end of said bar and to a fixed element, said bar having a recess in the under surface thereof, and locking means cooperating with said bar and received within said recess for maintaining said article receiving means in article receiving position, a fixed element positioned beneath said bar and intermediate its ends and causing rotation of said bar to release said locking means from said recess upon reception of an article of predetermined weight whereby said article receiving means may be rotated to article discharging position by pivotal action.

5. An apparatus for grading articles by weight comprising a pivoted beam biased to one position, an article receiving means comprising a trough pivotally supported on said beam in an off-center position, means for retaining said article receiving means in article receiving position and including a multi-element link mechanism secured to said trough and to a fixed point, and fixed means releasably engaging one of the elements of said link mechanism for maintaining said link mechanism and trough locked in article-receiving position, and other fixed means contacting said one element of said link mechanism providing a pivot for said one element for releasing the first mentioned fixed means when said article receiving means receives an article of predetermined weight to rotate said one element about said pivot, whereby said article receiving means may be rotated to article discharging position.

6. An apparatus for grading articles by weight including a beam pivoted intermediate its ends, an article receiving means pivotally mounted off-center at one end of said beam and including a trough, and an adjustable weight at the other end of said beam, a pivoted link mechanism secured to said trough, said link mechanism including a bar normally maintained in horizontal position, said bar having a recess in the under surface of said bar and locking means cooperating with said recess for maintaining said article receiving means against pivotal action, and a fixed element intermediate the ends and under said bar cooperating with said bar for causing rotational movement of said bar out of contact with said locking means when said article receiving means receives an article of predetermined weight whereby said article receiving means will be rotated to discharge said article.

7. An apparatus for grading articles by weight and including an inclined base, a plurality of registering units mounted adjacent each other on said base, each unit including a beam pivoted intermediate its ends, an article receiving trough pivotally mounted off-center at one end of said beam, an adjustable weight at the other end of said beam, a pivoted link mechanism secured to said trough, said link mechanism including a member normally maintained in horizontal position, said member having a recess therein and locking means cooperating with said recess for maintaining said trough against pivotal action, and a fixed element cooperating with said member and causing relative movement of said member and said locking means when said article receiving trough receives an article of predetermined weight whereby said pivoted article receiving trough will be rotated to discharge said article.

STEPHEN PEKAR.

REFERENCES CITED

The following references are of record in the file of this patent:

UNITED STATES PATENTS

| Number | Name | Date |
| --- | --- | --- |
| 1,199,184 | Hubman | Sept. 26, 1916 |
| 1,355,999 | Nelson | Oct. 19, 1920 |
| 2,353,539 | Beach | July 11, 1944 |

FOREIGN PATENTS

| Number | Country | Date |
| --- | --- | --- |
| 401,043 | Great Britain | Nov. 9, 1933 |